INVENTORS
JAMES O. ANDERSON
DONALD D. COLEMAN
BRICE E. THORNTON
BY
ATTORNEY

FIG. 5

INVENTORS
JAMES O. ANDERSON
DONALD D. COLEMAN
BY BRICE E. THORNTON

ATTORNEY

3,500,404
RADAR SYSTEM HAVING IMPROVED RESPONSE TO SMALL TARGETS
James Orville Anderson, Fullerton, Donald D. Coleman, Garden Grove, and Brice E. Thornton, Santa Ana, Calif., assignors to North American Rockwell Corporation
Filed Feb. 3, 1965, Ser. No. 430,141
Int. Cl. G01s 7/28
U.S. Cl. 343—17.1    10 Claims The subject invention relates to a radar system having improved response to small targets, and more particularly to the combination of a transmitting technique and receiving technique for enhancing the response of the radar to small targets relative to large targets.

In the tactical use of airborne military radars, the targets of principal interest are generally sharply defined objects such as armored tanks, trucks, bridges or buildings which are small relative to surrounding terrain features, and relative to the range resolution and angular resolution performance of the radar system. Such small targets are difficult to distinguish amid the clutter return from the terrain or like targets of large radial extent relative to the range resolution of the radar system pulsewidth and lying at a similar range and direction as the small target of tactical interest.

Visual displays of information extracted from radar echoes received from terrain are marked by "sparkling" (the random appearance and disappearance of spots of high intensity) and other optical noise phenomena. Such optical noise phenomena may have a masking effect on small targets, concealing them from an operator's view or even appearing as targets of interest where there are none. In either case, the tasks of target identification, target classification and correct interpretation of radar-produced ground maps are made difficult.

Such fluctuation of the radar return or received radar echo signals, is characteristic of the radar return from a target having a radial extent (or radar range extent or size) which is at least as large as that represented by the pulsewidth of a pulsed radar system having a fixed carrier frequency, as is well known in the art. Such familiar fluctuation of the radar return from an extended target occurs due to changes in the vector sums of the reflections from discrete reflective areas of the extended target (lying within the beamwidth) caused by changing the target aspect angle relative to the radar (as in the case of a scanning radar or in the case of a moving airborne radar).

Other types of extended size background targets in which smaller size targets (such as airborne vehicles) are sought to be detected are rain storms and passive ECM (electronic counter measures such as dispersed clouds of reflective foil). These extended size targets similarly provide a large fluctuating clutter return.

The clutter return from such extended targets is generally considerably larger than the radar return from the smaller targets of tactical interest (having a radial extent much less than that represented by the system pulsewidth and a transverse or angular extent less than the beamwidth of the radar antenna). Therefore, the higher energy level of the clutter return, even though fluctuating in nature, may be sufficiently larger than the relatively constant, but low, energy level of the small tactical targets, whereby the precise location and even presence of such tactical targets is obscured.

In the case of a small moving target, moving relative to the clutter-producing background, the spectral content of the small target echo may be distinguished from the spectral content of the larger clutter return in view of the relative Doppler shift between them. Hence, where the ground speed of the moving target is great enough so as to provide a return having a spectrum of frequencies outside the spectrum of the clutter return, prior-art AMTI techniques of Doppler bandpass filtering may be used to attenuate or reject the high-energy level clutter spectrum while retaining (for display purposes) the low-energy level spectra indicative of the moving target radar signal, as is well understood in the art.

Where, however, the relative velocity of the tactical target to the clutter-producing background is very low (as in the case of slow-moving military ground vehicles or stationary tactical targets) or the bandwidth of the clutter spectra is very wide (due to a large antenna beamwidth or large look-angle), the lesser spectral content of the tactical target radar return may lie within the spectrum of the larger clutter return, whereby frequency discrimination or Doppler filtering of AMTI techniques cannot be effectively employed.

Conventional attempts to limit the resolution of the response of the pulsed radar system will generally not improve the ability of the radar system to distinguish small targets from clutter at the tactical (maximum) ranges of interest. For example, the range resolution of the pulsed radar system is limited by the pulsewidth of the transmitted radar energy pulses. The minimum pulsewidth, for a radar of limited peakpower, is selected from considerations of maximum range performance of the radar system, it being necessary that the leading edge of the pulse echo from the further radial extent of the target overlap with the trailing edge of the pulse echo from the front of the target to "integrate" the echo return or provide a combined echo return sufficiently above the noise level of the system as to indicate the presence of a target at such range. Therefore, attempts to reduce the transmitted pulsewidth will reduce the maximum range-performance of the system to detect such small targets, and not necessarily enhance the ability of the radar system to distinguish those small targets from clutter.

Similarly, prior art means for improving the angular resolution of a pulsed radar system (for limiting the clutter-producing target area thus lying within the beamwidth) are of limited effectiveness. Improved angular resolution may be sought by reducing the angular extent of the antenna beamwidth. Such narrower beamwidth is conventionally obtained by increasing the physical size of the antenna aperture (i.e., the dimension of the reflector). However, in an airborne radar application, the extent to which the physical size of the antenna aperture may be so increased is limited by the installation provisions provided for the radar. Other prior art angular resolution improvements exist, such as the British monopulse resolution technique of Taylor and Wescott (described more particularly at pages 60 and 61 of "Introductions to Monopulse" by Rhodes, published by McGraw-Hill (1959)). However, because of the shallow elevation (depression) angles of the boresight axis of the forward-looking directional antenna in an airborne application, the terrain presents a radial extent substantially in excess of that represented by the system pulsewidth, thereby providing a substantial clutter return even with beam sharpening techniques. Accordingly, prior art beamsharpening techniques for enhancing target resolution are of limited effectiveness.

In an airborne mapping radar for use on high speed aircraft, the use of small elevation beamwidth would require the antenna to nod in elevation, as well as scan in azimuth, in order to provide adequate coverage in elevation for mapping purposes, thereby reducing the rate at which radar data is generated. Accordingly, practical mapping radars which achieve a high data rate, as well as adequate coverage, employ a vertically-oriented, fan-shaped beam (broad elevation beamwidth and narrow azimuth beamwidth) which is scanned in azimuth. The large area of the terrain thus lying within such beamwidth cooperates with the finite pulsewidth of the pulsed radar system to necessarily provide a substantial clutter return, however.

Attempts to enhance the detection of a small target echo contained in clutter return have included time-coherent integration or the additive combining of corresponding range portions of the range-trace signals received during a selected number of successive pulse intervals, by means of a tapped delay line or scan converter, as described for example, in U.S. Patent No. 3,113,311, issued Dec. 3, 1963, to Searle and Henderson for a Radar Integrating System.

However such technique is of limited effectiveness, determined by the limited number of successive range trace signals which may be so combined or the maximum number of pulse repetition intervals over which it is desired to perform time-coherent integration (the additive combining of that portion of each of the successive range trace signals corresponding to a selected range increment of interest). Such limitation, either from the standpoint of the amount of signal storage capacity required, or the allowable length of the data processing interval, limits the minimum signal-to-clutter ratio for which a signal may be detected.

It has been discovered that the signal-to-clutter ratio for small targets (e.g., targets having a transverse extent less than the antenna beamwidth, and presenting a radial extent less than that represented by the transmitted pulsewidth) may be substantially and significantly enhanced by the pulsed transmission of a plurality of discrete carrier frequencies, representing a plurality of successively increased frequencies, the frequency difference between successive discrete frequencies being not less than that bandwidth corresponding to the reciprocal of the transmitted pulsewidth; and then combining the echoes thereof received from a given target direction and range. The degree of signal-to-clutter enhancement increases with an increase in the number of discrete carrier frequencies so employed. Hence, by means of the concept of the invention, an improved radar range trace signal is provided.

The concept of the invention (the pulsed transmission of a plurality of discrete carrier frequencies, the frequency difference between successive ones of which is at least that frequency represented by the reciprocal of the system pulsewidth, and combining the range trace signals from the received echoes thereof to provide an improved range trace signal) is to be distinguished from the prior art concept of the "chirp" technique. By means of the "chirp" technique, the frequency of a single carrier signal is progressively increased during the transmission pulsewidth from an initial frequency to a final frequency; the corresponding receiver technique employing a phase dispersive delay line having a phase versus frequency dispersion, or delay variation as a function of frequency, which is intended to match and inversely correspond with the phase dispersion incident to the "chirping" or variation of the chirped carrier frequency. In other words, the chirp delay line causes the lower frequencies of the received echoes (corresponding to the initial portion of the transmitted pulsewidth) to be delayed by an amount corresponding to the pulsewidth interval between the generation of such lower frequencies and the higher frequencies (corresponding to the terminal portion of the pulsewidth). In this way, the processed energy of the received echo pulsewidth is "compressed" or processed into a shorter pulsewidth having a higher associated energy peak. The effect of such pulse compression of the received echoe of such "chirped" carrier is improved range resolution, as is well known in the art.

However, such chirp technique does not involve a range of discrete carrier frequencies having a common pulsewidth. Nor does such chirp technique employ a plurality of discrete carrier frequencies representing a plurality of successively increasing frequencies, the frequency difference between successive ones of which is at least that bandwidth corresponding to the reciprocal of the transmitted pulsewidth. Therefore, the chirp technique does not perform the function of the concept of the subject invention, in that the chirp technique, while providing improved range resolution, yet does not provide for enhancement of the radar return from small targets while employing the phase-cancelling effects of the combined returns from the random distribution of discrete scatterers comprising the clutter-producing background for *each* carrier frequency, over the *pulsewidth* duration thereof, as is achieved by the subject invention. Further, even the range-resolution improvement achieved by the chirp technique is limited by the ability to match, and maintain a match, between the frequency-versus-time variation of the transmitted pulsewidth and phase-versus-frequency dispersion characteristic of the receiver dispersive line.

In a prefererd embodiment of the subject invention, there is provided a pulsed radar system having enhanced small target response, and comprising pulsed means for transmitting (within a preselected period) pulsed energy at more than one discrete carrier frequency, the frequency difference between each one of a pair of discrete carrier frequencies being at least that represented by the reciprocal of the transmitted pulsewidth. There is further provided means responsive to received echoes of the pulse energy reflected from a target for providing, within a data processing period corresponding to the preselected period, an output signal having a time-phase indicative of the range of the target, and an amplitude indicative of the combined spectral energy content of the received echoes.

By means of the above described arrangement, those components of the received echoes from a small target tend to correlate or cumulatively combine to provide an enhanced signal indicative of such small target; while the components of the received echoes from a clutter background in the vicinity of the target tend to mutually decorrelate (1) over the duration of the pulsewidth echo for each discrete frequency and (2) as between the received echoes of two discrete frequencies, as to provide an attenuated clutter return. Hence, an improved signal-to-clutter response is obtained.

Such enhanced signal-to-clutter performance makes possible the detection of small targets lying within the clutter spectra provided by terrain features (or the ocean waves), rainstorms, or passive ECM. Also, because of the enhanced signal-to-clutter ratio performance thus obtained, monopulse resolution improvement techniques may be more effectively employed in combination therewith, to provide a higher degree of improved resolution performance than heretofore possible against a clutter background. Accordingly, it is a broad object of the subject invention to provide an improved radar system.

It is another object of the subject invention to provide means for enhancing the response of a radar system to small targets.

It is yet another object of the invention to provide means for enhancing the ability of a radar system to detect small targets lying within a clutter background.

It is a further object of the invention to provide means for enhancing the response of a radar system to the echoes from a small target which lie within the frequency spectrum of a clutter background located in the vicinity of such target.

These and other objects of the invention will become apparent from the following description, taken together with the accompanying drawings, in which.

In the figures, like reference characters refer to like parts.

Figure 1:
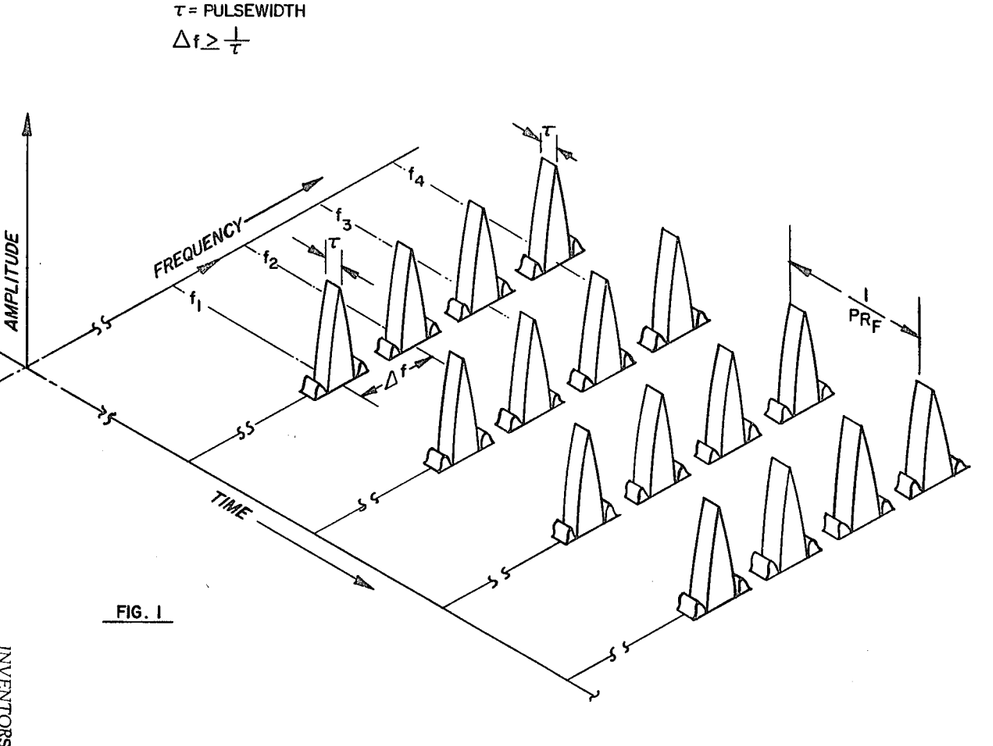
FIG. 1 is a diagram of time-histories illustrating the periodic pulsed transmission of a plurality of discrete carrier frequencies.

Referring to FIG. 1, there is illustrated a time history of several pulse repetition intervals of a plurality of discrete carrier wave frequencies ($f_1$, $f_2$, $f_3$ and $f_4$) periodically pulsed for a pulsewidth or duration T, at a selected pulse repetition frequency (PRF). The spectral distribution shown about each spectral line corresponding to a discrete carrier frequency is that spectral distribution contributed by the pulsewidth, T, as is well understood in the art. Where the frequency spacing or difference frequency ($\Delta f$) between adjacent or successive ones of the discrete carrier frequencies ($f_1$, $f_2$, $f_3$ and $f_4$) is maintained at least as large as, and preferably substantially greater than, the banwidth corresponding to the reciprocal of the pulsewidth ($\Delta f \cong 1/T$), then the correlation between the received echoes of such frequencies tends to be inversely indicative of the size of the target, as shown in FIG. 2.

Figure 2:
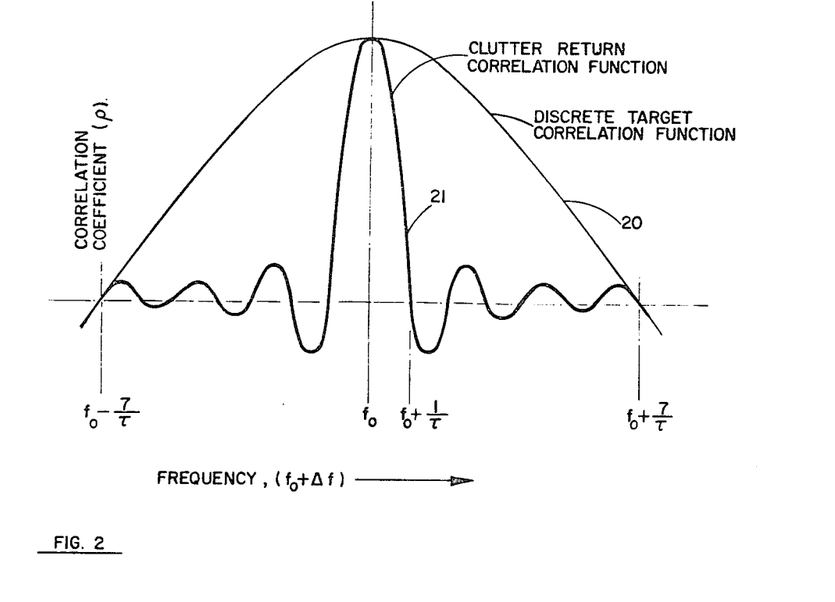
FIG. 2 is a curve of the correlation coefficient as a function of carrier frequency for a respective one of a small target return and clutter background.

Referring to FIG. 2, it is seen from curve 20 that the correlation over the pulsewidth for the echo from a small or discrete target is high at each frequency, due to the minimum random phase-cancellation effects caused by such discrete target. Hence, the cumulative effect of such target correlation coefficient (as indicated by the area about the center frequency, $f_0$, bounded by curve 20) will provide a relatively large signal return from such discrete target. Conversely, it is seen from curve 21 that the correlation coefficient over the pulsewidth for the clutter return from a target of large radial extent (relative to the transmitted pulsewidth) is low at each discrete frequency relative to that for the center frequency, $f_0$, due to the phase-cancellation or mutual interference effects caused by the random distribution of discrete scatterers comprising the large radial extent of the clutter-producing target. Accordingly, the cumulative effect of such decrease in the correlation coefficient (as indicated by the net area under curve 21) will provide a relatively low signal return. It is apparent from FIG. 2 that the area under curve 20 significantly increases as the spacing frequency ($\Delta f$) is increased from $1/T$ to $7/T$, while the net area under curve 21 is correspondingly little affected.

Figure 3:
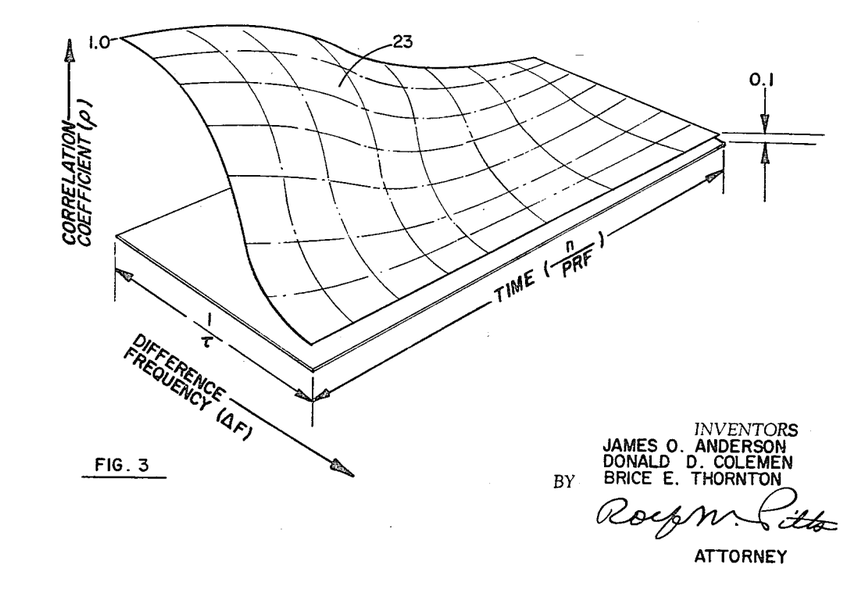
FIG. 3 is a curved plane illustrating the variation of the clutter correlation coefficient as a function of the number of pulse repetition intervals and the frequency difference (between two discrete carrier frequencies).

A prior art method of attempting to employ the decorrelative characteristics of the clutter return for attenuation of the same has been the use of pulse-to-pulse integration, or time coherent integration, wherein the signal returns from a selected *number* of successive pulse repetition intervals are stored and combined. The functional equivalence of such prior art method and the method of the invention is shown in the three dimensional surface 23 plotted in FIG. 3. However, it is to be noted that a major point of distinction of the concept of the invention is that such equivalent attenuation of the clutter return may be accomplished within a single pulse repetition interval. In other words, by means of the invention the clutter at a given range and direction may be suppressed within the return echo from a single transmitted pulsewidth.

The degree of such clutter atenuation provided by means of the invention may be enhanced by increasing the number of discrete frequencies which are spaced apart in frequency by at least the reciprocal of the bandwidth, or by the time-coherent integration method or by a combination of both of them.

Figure 4:
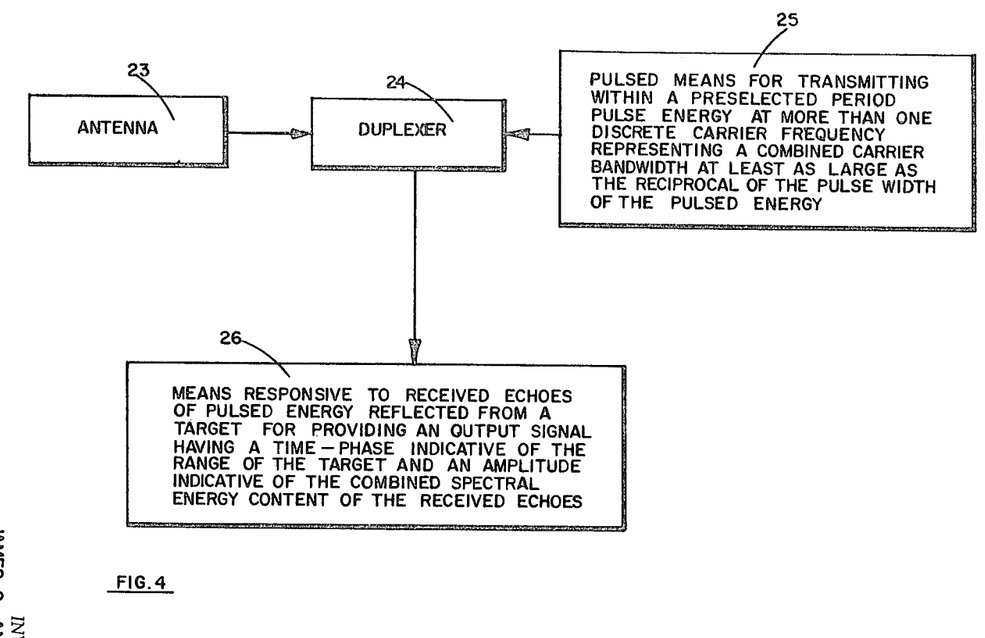
FIG. 4 is a block diagram of the concept of the invention.

Referring to FIG. 4, there is illustrated in block form a system employing the concept of the invention. There is provided a radar antenna 23 and duplexer 24 useful for both receiving and transmitting microwave energy, as is well understood in the art. Because the construction and arrangement of elements 23 and 24 are well known, such elements are shown in block form only. There is also provided pulsed means 25 connected to duplexer 24 for transmitting within a preselected period pulsed energy at more than one discrete carrier frequency representing a combined carrier bandwidth at least as large as the reciprocal of the pulsewidth of the pulsed energy. There is further provided means 26 connected to duplexer 24 and responsive to received echoes of pulsed energy reflected from a target for providing an output signal having a time-phase indicative of the range of the target and an amplitude indicative of the combined spectral energy content of the received echoes. The construction and arrangement of elements 25 and 26 are more fully described hereinafter in connection with FIGS. 5 and 6; and are therefore shown in block form in FIG. 4 for convenience in exposition only.

Figure 5:
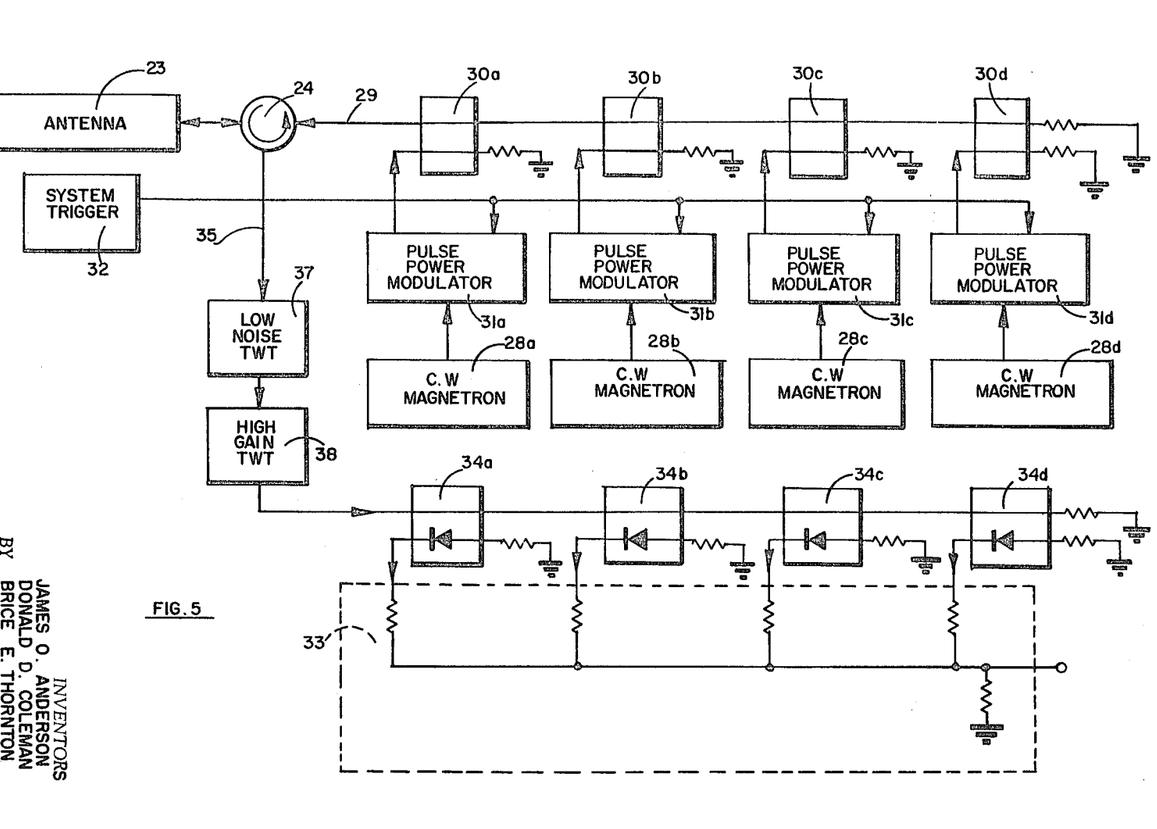
FIG. 5 is a block diagram of one embodiment of the concept of FIG. 4.

Referring to FIG. 5, there is illustrated an exemplary embodiment of the concept of FIG. 4. There is provided pulsed means corresponding to element 25 of FIG. 4 and comprising a plurality of means for pulsing microwave energy having discrete carrier frequencies. Each microwave pulsing means comprises a continuous wave (C.W.) magnetron 28 for providing a mutually exclusive carrier frequency and coupled to a common microwave input 29 of duplexer 24 by means of a directional filter 30, a pulse power 31 modulator being interposed between each filter 30 and an associated magnetron 28 and responsively coupled to system trigger 32 for pulse modulation of the magnetron in synchronism with the system trigger. The construction and arrangement of pulse modulators 31 and magnetrons 28 as well understood in the art, and these elements are therefore shown in block form only. Although the magnetron has been shown as being operated in a C.W. mode, the output of which is pulse modulated by element 31, it is clear that alternatively the excitation of the magnetron 28 may be pulse-controlled to directly provide a pulsed microwave output therefrom to filter 30.

Each of the directional filters 30 is a tuned microwave filter, tuned to the discrete carrier frequency provided by the associated one of magnetrons 28. Hence, in normal operation, each of tuned filters 30 inserts the microwave energy at such tuned frequency at input 29 of circulator 24. Because each of the filters 30 is tuned to that mutually exclusive microwave carrier frequency which it injects into microwave transmitter feed section 29, such filter does not respond to the other discrete carrier frequencies injected into element 29, and hence acts as a unidirectional microwave filter.

Figure 7:
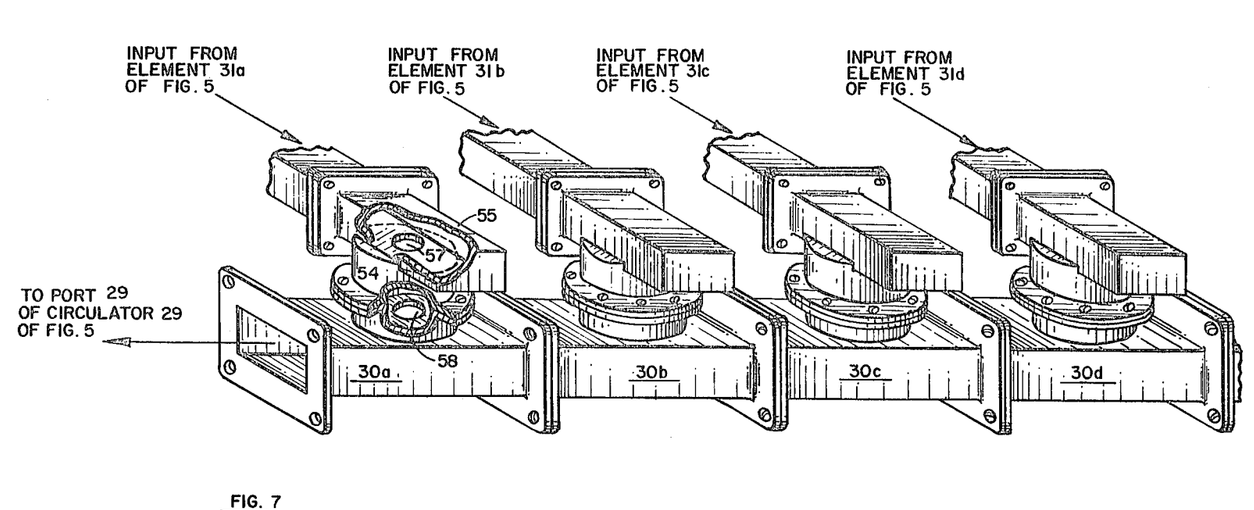
FIG. 7 is an exemplary arrangement of a portion of the transmitter of FIG. 5.

An injection waveguide assembly comprising a plurality of such tuned waveguide directional filters may be assembled from units commercially available, for example, from Melabs of 330 Hillview Ave., Stanford Industrial Park, Palo Alto, Calif., as shown in FIG. 7. Referring to FIG. 7, each of waveguide directional filters 30a, 30b, 30c and 30d is comprised of a cylindrical cavity 54 (having a mutually exclusive resonant frequency corresponding to that one of the discrete carrier frequencies to be injected thereby) coupled into two rectangular waveguide sections 55 and 56 by means of circular apertures 57 and 58. A corresponding first one of the two waveguide sections of each filter is directly connected in microwave communication with that of a succeeding section to comprise the assembly of filters. Each of coupling apertures 57 and 58 is located off-center of an associated one of the rectangular waveguides such that a signal entering the waveguide excites a circularly polarized wave in the cavity 54. Conversely a circularly polarized wave in the cylindrical cavity will produce a directional travelling wave in the rectangular waveguide. Energy at the resonant frequency of the circular cavity of a given filter is coupled therethrough from one of waveguide sections 55 and 56 to the other. Energy at other than such resonant frequency is not substantially so coupled.

The receiving means in FIG. 5, corresponding to element 26 of FIG. 4, may be comprised of a video signal summing impedance 33 and a plurality of signalling means. Each signalling means may comprise a directional microwave filter 34 commonly coupled to a receiving port 35 of circulator 24 and tuned to be responsive to a mutually exclusive one of the transmitted discrete carrier frequencies. Mounted within each receiver filter 34 is a diode 36 or other microwave detection means responsive to the tuned microwave response of such filter for providing a video detected output signal, each input of the video summing means 33 being responsive to a mutually exclusive one of such video detected outputs. The construction and arrangement of the receiver directional filters 34 is similar to that for the transmitter directional filters 30, but for the insertion and cooperation of diodes 36, such units being similarly commercially available.

Because of the minimum allowable signal levels required across diodes 36 in order to affect video detection, microwave amplification means is interposed between output port 35 and the inputs to directional filters 34. Such microwave amplification means may be comprised of a low noise level travelling wave tube 37 such as is commercially available, for example, from Microwave Electronics Corporation of 3165 Porter Drive, Stanford Industrial Park, Palo Alto, Calif., and a high-gain travelling wave tube 38, responsive to element 37 and of a type commercially available such as model W-J276 manufactured by Watkins-Johnson of 3333 Hillview Ave., Stanford Industrial Park, Palo Alto, Calif.

In normal operation of the arrangement of FIG. 5, the plurality of synchronously pulsed discrete carriers provides a periodically transmitted spectrum corresponding to that described in connection with the description of FIG. 1. The non-coherent receiving channels corresponding to the several summing inputs of video summing means 33 provide unipolar video detected signals corresponding to received echoes reflected from a radar target for each of the discrete frequencies, such discrete video signals being combined by summing means 33 to provide an output signal corresponding to the net area under that one of curves 20 and 21 of FIG. 2 which is indicative of the style of detected target, and delayed relative to the system trigger by an amount indicative of the range of the target. Where, of course, a discrete target lies in the same direction and at the same distance as a clutter-producing target of large extent, then that component of the output signal due to the clutter will tend to be suppressed or self-cancelling, and that component of the receiver output due to the discrete target will tend to be enhanced, whereby such small target may be more readily detected in the presence of such clutter.

Although the embodiment of FIG. 5 provides means for synchronously pulsing the discrete carrier frequencies which provide the transmitted spectra of FIG. 1, the concept of the invention is not so limited. Instead, each of such pulsed discrete carrier frequencies may be separately transmitted during a mutually exclusive one of successive pulse repetition intervals, and the received echoes therefrom stored so that they may be combined to effect the discrete target enhancement process, as shown in FIG. 6.

Figure 6:
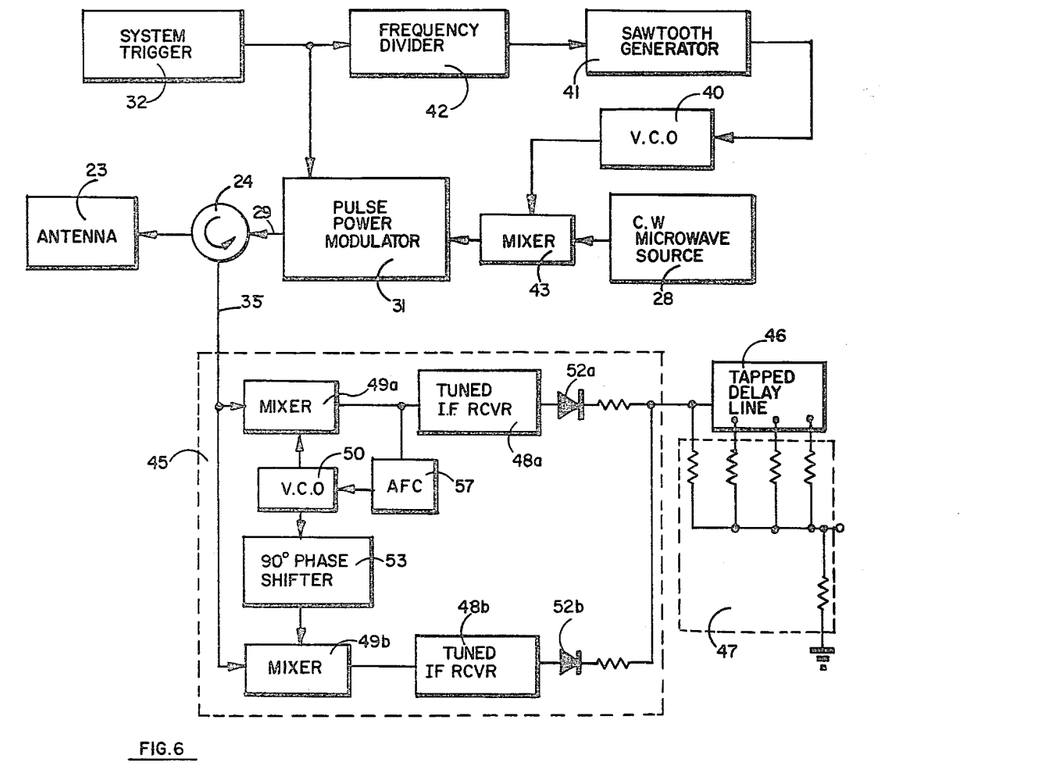
FIG. 6 is a block diagram of an alternate embodiment of the concept of FIG. 4.

Referring to FIG. 6, there is shown an alternate embodiment of the inventive concept of FIG. 4. There is provided pulse-to-pulse frequency agility means for discretely varying the carrier frequency of a pulsed transmitter at each pulse repetition interval, until each of the discrete carrier frequencies comprising a selected band of carrier frequencies has been generated, corresponding to the spectral distribution illustrated in FIG. 1.

There is provided antenna 23, circulator 24, magnetron 28, pulse power modulator 31, and system trigger 32, all arranged to cooperate substantially the same as like referenced elements of FIG. 5. In addition, there is also provided a voltage-controlled oscillator 40 responsively connected to a sawtooth generator 41 for providing a cyclically varying output frequency in response to the cyclically varying amplitude of the sawtooth generator output. Generator 41 is responsively coupled to a frequency divider 42, which in turn, is coupled to system trigger 32 for providing a periodic input to generator 41 at a frequency which is an integer submultiple of the pulse repetition frequency of the system trigger, which integer corresponds to the number of discrete carrier frequencies to be generated. In this way, the periodicity of the generator is an integer multiple of the system trigger pulse repetition interval.

A mixer or single side band modulator 43 is interposed between magnetron 28 and modulator 31 and responsively coupled to the output of oscillator 40, whereby a cyclically varying microwave signal is applied to the input of modulator 31.

In normal operation of the pulsed transmitter arrangement of FIG. 6, modulator 31 pulse modulates the variable frequency microwave energy applied to the input thereof in synchronism with the operation of system trigger 32, such variable frequency being progressively increased each successive pulse repetition interval by an amount equal to at least the reciprocal of the transmitted pulsewidth for a number of pulse repetition periods equal to the periodicity of frequency divider 42, and corresponding to the preselected number of discrete carrier frequencies to be so generated.

Because of the short duration of the pulsewidth (about one microsecond) relative to the periodicity of frequency divider 42, it is to be appreciated that the pulsed carrier frequency transmitted during a given pulse repetition interval is substantially a constant or discrete frequency, the frequency difference between the single discrete frequencies of preselected number of successive pulse repetition intervals being equal to at least the reciprocal of the pulsewidth. Hence, where a fixed frequency spacing, or fixed difference frequency, is maintained between the progressively increased discrete frequencies of successive pulse repetition intervals, the transmitted carrier bandwidth is equal to an integer multiple of such difference frequency, such integer being the preselected number of discrete frequencies less one.

There is further provided receiving means 45 for processing received echoes of the pulsed transmitter energy of the total transmitted carrier bandwidth, signal storage means 46 responsive to receiver 45 for storing the received echoes of pulsed transmitter energy received during the preselected number of pulse repetition intervals representing the total transmitted bandwidth, and signal combining means 47 responsive to signal storage means 46 for combining corresponding range-time portions of the stored signals to provide a combined range-trace signal.

An exemplary construction and arrangement of the range coherent memory elements 46 and 47 is more fully described in the above noted U.S. Patent No. 3,113,311 issued to Searle and Henderson.

Receiver 45 may be comprised of a first tuned IF receiver 48a coupled to a first microwave mixer 49a which in turn, is responsively connected to both receiver port 35 (of circulator 24) and the output of the voltage controlled local oscillator 50 of an AFC (automatic frequency control) loop. The AFC loop includes frequency discrimination means 57 responsive to the frequency differences between the output of mixer 49a and the tuned frequency of IF means 48a for control of local oscillator 50 so as to reduce such difference, as is well understood in the art. The construction and arrangement of elements 48a, 49a, 50 and 51 are well known in the art, being variously described for example, in U.S. application Ser. No. 374,728, filed June 12, 1964, by E. F. Laporte; therefore, such elements are shown in FIG. 6 in block form only.

In operation of the above described non-coherent receiver arrangement, the video amplitude of the received echo for each discrete frequency of each of the preselected number of successive pulse repetition intervals is video detected by means of receiver diode 52a, or like video detection means, in series with tapped delay line 46. Then all of the discrete frequency echoes corresponding to a like range increment are combined by summing means 47 to provide an output signal having a time-phase relative to the system trigger which is indicative of the range of a detected target, and an amplitude which is enhanced in response to discrete targets and suppressed in response to clutter-producing targets of large radial extent. In other words, the detection of discrete targets in the persence of clutter is similarly enhanced by the arrangement of FIG. 6, as for the arrangement of FIG. 5.

Because of the inherent time phase reference provided by the local oscillator 50 of receiver 45, an attenuation of the received signals may result, corresponding to the cosine of the incident phase angle between such signals and the local oscillator. Such affect may be avoided by the inclusion of a second receiver section having a quadrature time phase relation relative to the first.

Accordingly, there is further provided in receiver 45 of FIG. 6, a second tuned IF receiver 48b and second mixer 49b similarly arranged as elements 48a and 49b, a quadrature phase-shifter 53 being interposed between the output of local oscillator 50 and the (associated) input of mixer 49b. The video detected outputs of IF means 48a and 48b are combined by a signal summing network for insertion into the range-coherent memory, by means well understood in the art.

Although, the non-coherent receiver 45 of FIG. 6 has been described as frequency-agility, tuned IF receivers 48a and 48b empolying an AFC loop, broadband receivers (having a suitably broad bandwidth response equal to the total transmitter bandwidth) may be used, whereby AFC unit 57 may be omitted; and a suitable fixed frequency source employed for local oscillator 50. Alternatively, receiver 45 may be comprised of a plurality of tuned receivers, each responsive to a mutually exclusive one of the discrete carriers transmitted, as described in connection with the description of FIG. 5. In this way, the discrete frequency echo received during a given pulse repetition interval is processed by the corresponding receiver channel and then stored in the tapped delay line 46 or like element of the range coherent unit, as before.

Therefore, it is understood that the receiver to be employed with the frequency agility transmitter of FIG. 6 may be comprised of either a frequency-agility narrow bandpass receiver, a plurality of narrow bandpass receivers providing the required receiver bandwidth, or a wide bandpass receiver, each cooperating with a range coherent memory (such as elements 46 and 47 of FIG. 6).

Also, although the non-coherent receiver employed with the means for simultaneous transmission of a plurality of discrete frequencies, shown in FIG. 5, is a plurality of receivers, each responsive to a mutually exclusive one of such discrete frequencies, other receiver combinations may be employed. For example, a tuned receiver may be employed in cooperation with a range coherent memory in FIG. 5, corresponding to the general receiver arrangement of FIG. 6, the receiver being programmed to be responsive to a different one of the discrete frequencies during each successive pulse repetition interval. Further, although non-coherent receiver means have been illustrated in conjunction with the embodiments of FIGS. 5 and 6, the concept of the invention is not so limited, coherent receiver techniques being equally applicable.

Accordingly, a radar system has been described which provides enhanced response to discrete targets relative to a clutter background containing such discrete targets. Because of the attenuated response of such system to radar clutter return, the ability to detect military targets against a clutter background, such as an extended submarine periscope in a sea, is distinctly enhanced. Also, beam-sharpening techniques may be more effectively employed with the system of the invention, to obtain improved angular resolution as well as improved range resolution, whereby improved target definition results.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A pulsed radar system having enhanced small target response comprising
   pulsed means for transmitting within a preselected period pulsed energy at more than one discrete carrier frequency representing a combined carrier bandwidth greater than the reciprocal of the pulsewidth of said pulsed energy multiplied by one less than the number of said discrete frequencies; and
   means responsive to the combination of received echoes of said pulsed energy reflected from a target for providing an electrical output signal having a time-phase indicative of the range of said target, and an amplitude indicative of the combined spectral energy content of said received echoes.

2. A pulsed radar system having enhanced small target response comprising
   pulsed means for transmitting within a preselected period pulsed energy at more than one discrete carrier frequency, the frequency difference between each pair of discrete carrier frequencies being greater than that represented by the reciprocal of the transmitted pulsewidth; and
   means responsive to the combination of received echoes of said pulsed energy reflected from a target for providing an electrical output signal having a time-phase indicative of the range of said target, and an amplitude indicative of the combined spectral energy content of said received echoes.

3. A pulsed radar system having enhanced small target response comprising
   pulsed means for transmitting within a preselected period pulsed energy at least two discrete carrier frequencies between which a difference frequency is maintained larger than that represented by the reciprocal of the pulsewidth of said pulsed energy; and
   means responsive to the combination of received echoes of said pulsed energy reflected from a target for providing, within a data processing period corresponding to said preselected period, an electrical output signal having a time-phase indicative of the range of said target and an amplitude indicative of the beat frequency spectral energy of said received echoes.

4. A pulsed radar system having enhanced small target response comprising
   pulsed means for transmitting within a preselected period pulsed energy at $n$ discrete carrier frequencies and representing a combined carrier bandwidth which is larger than the multiple $(n-1)$ of the reciprocal of the pulsewidth of said pulsed energy; and
   means responsive to the combination of received echoes of said pulsed energy reflected from a target for providing within a data processing period, corresponding to said preselected period, an electrical output signal having a time-phase indicative of the range of said target, and an amplitude indicative of the combined spectral energy content of said received echoes.

5. A pulsed radar system having enhanced small target response comprising pulsed means for transmitting, with a preselected integer multiple of pulse repetition periods, pulsed energy at discrete carrier frequencies and representing a combined carrier bandwidth which is larger than one less said preselected integer multiple of the reciprocal of the pulsewidth of said pulsed energy; and means responsive to the combination of received echoes of said pulsed energy reflected from a target for providing, within a data processing period corresponding to said preselected multiple of pulse repetition periods, an output signal having a time-phase indicative of the range of said target and an amplitude indicative of the beat-frequency spectral energy said received echoes.

6. In a pulsed radar system having a pulsed transmitter and receiver, means for enhancing the response of said radar system to small targets relative to that for large targets, comprising frequency modulating means cooperating with said pulsed transmitter to provide a plurality of discrete carrier frequencies representing a total transmitted carrier frequency bandwidth greater than that bandwidth represented by the reciprocal of the pulsewidth of said pulsed transmitter multiplied by one less than the number of said discrete frequencies, and signal combining means cooperating with said receiver for processing received echoes of pulsed energy of said total bandwidth received from a radar target to provide a combined electrical output signal indicative of the range of said target.

7. In a pulsed radar system having a pulsed transmitter and receiver, means for enhancing the response of said radar system to small targets relative to that for large targets comprising pulse-to-pulse frequency agility means cooperating with said pulsed transmitter to provide a plurality of discrete carrier frequencies representing a combined transmitted carrier frequency bandwidth greater than that bandwidth represented by the reciprocal of the pulsewidth of said pulsed transmitter multiplied by one less than the number of said discrete frequencies, and pulse-to-pulse time-coherent correlation means cooperating with said receiver for processing and combining electrical signals corresponding to received echoes of pulsed transmitter energy of said combined carrier bandwidth.

8. In a pulsed radar system having a pulsed transmitter and receiver, means for enhancing the response of said radar system to small targets relative to that for large targets comprising pulse-to-pulse frequency agility means cooperating with said pulsed transmitter to provide a total transmitted carrier frequency bandwidth of discrete carrier frequencies between adjacent ones of which is a frequency spacing greater than that bandwidth represented by the reciprocal of the pulsewidth of said pulsed transmitter;

means cooperating with said received for processing received echoes of pulsed transmitter energy comprising said total bandwidth; and pulse-to-pulse time-coherent correlation means cooperating with said wide band processing means for combining electrical signals corresponding to said received echoes of pulsed transmitter energy represnting said total transmitted bandwidth.

9. In a pulsed radar system having a pulsed transmitter and receiver means for enhancing the response of said radar system to small targets relative to that for large targets comprising pulse-to-pulse frequency agility means for discretely varying the carrier frequency of said pulsed transmitter to provide within a preselected number of pulse repetition periods a total transmitted carrier frequency bandwidth of $n$ discrete carrier frequencies which is greater than the multiple $(n-1)$ of that bandwidth represented by the reciprocal of the pulsewidth of said pulsed transmitter;

means cooperating with said receiver for processing received echoes of said pulsed transmitter energy of said total bandwidth; and signal storage means responsive to said wide band processing means for storing said received echoes of pulsed transmitter energy received during said preselected number of pulse repetition periods and representing said total transmitted bandwidth, and signal combining means responsive to said signal storage means for combining corresponding range-time portions of said stored signals to provide a combined range-trace signal.

10. In a pulsed radar system having a pulsed transmitter and receiver means for providing enhanced response of said radar system to small targets relative to that for large targets comprising pulse-to-pulse frequency agility means cooperating with said pulsed transmitter to provide a total transmitted carrier frequency bandwidth of discrete carrier frequencies between adjacent ones of which is a frequency spacing greater than that bandwidth represented by the reciprocal of the pulsewidth of said pulsed transmitter;

narrow band processing means responsively coupled to said frequency agility means for processing received echoes of said pulsed energy;

pulse-to-pulse time-coherent correlation means cooperating with said narrow band means for electrically combining electrical signals indicative of said received echoes of said total transmitted bandwidth.

References Cited

UNITED STATES PATENTS

| 2,624,876 | 1/1953 | Dicke | 343—17.2 |
| 3,212,053 | 10/1965 | Finney | 343—17.2 XR |
| 3,212,087 | 10/1965 | Blass | 343—17.1 XR |
| 2,817,832 | 12/1957 | Mathes | 343—13 |

RICHARD A. FARLEY, Primary Examiner

MALCOLM F. HUBLER, Assistant Examiner

U.S. Cl. X.R.

343—13